United States Patent
Wang et al.

(10) Patent No.: US 7,551,254 B2
(45) Date of Patent: Jun. 23, 2009

(54) DISPLAYING DEVICE WITH PREDETERMINED PATTERN FOR REPAIRING ELECTRICAL DEFECTS HAVING SLIT REGION IN TFT CONTROLLED ELECTRODE IN WHICH A FIRST SLIT THEREIN CORRESPONDS TO A SPACE SEPARATING FIRST AND SECOND CAPACITOR ELECTRODES

(75) Inventors: Chung-Yi Wang, Tainan (TW); Rung-Nan Lu, Tainan County (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 666 days.

(21) Appl. No.: 11/119,342

(22) Filed: Apr. 28, 2005

(65) Prior Publication Data

US 2005/0259190 A1 Nov. 24, 2005

(30) Foreign Application Priority Data

Apr. 29, 2004 (TW) .............................. 93112096 A

(51) Int. Cl.
*G02F 1/1337* (2006.01)
(52) U.S. Cl. ..................... 349/130; 349/38; 349/192
(58) Field of Classification Search ................... 349/38, 349/39, 129, 130, 192
See application file for complete search history.

(56) References Cited

U.S. PATENT DOCUMENTS

| 5,691,786 | A | 11/1997 | Nakai |
| 6,839,112 | B2 * | 1/2005 | Chien et al. .................. 349/129 |
| 7,209,205 | B2 * | 4/2007 | Yoshida et al. ............... 349/139 |
| 2001/0052889 | A1 | 12/2001 | Fukunishi |

FOREIGN PATENT DOCUMENTS

| CN | 1327167 | 12/2001 |
| JP | 08-062634 | 3/1996 |
| JP | 2000-250056 | 9/2000 |
| JP | 2001109019 | 4/2001 |

* cited by examiner

*Primary Examiner*—David Nelms
*Assistant Examiner*—John Heyman
(74) *Attorney, Agent, or Firm*—Townsend and Townsend and Crew LLP

(57) ABSTRACT

A displaying device at least comprises a thin film transistor (TFT); a first electrode controlled by the TFT; a first capacitor electrode and a second capacitor electrode electrically connected to each other through the first electrode. The first electrode has a first slit. The first slit is positioned between a first zone and a second zone, wherein the first zone connects the first capacitor electrode and the first electrode, and the second zone connects the second capacitor electrode and the first electrode. If a defect is observed, a portion of the first electrode is removed for isolating the first capacitor electrode and the second capacitor electrode.

9 Claims, 10 Drawing Sheets

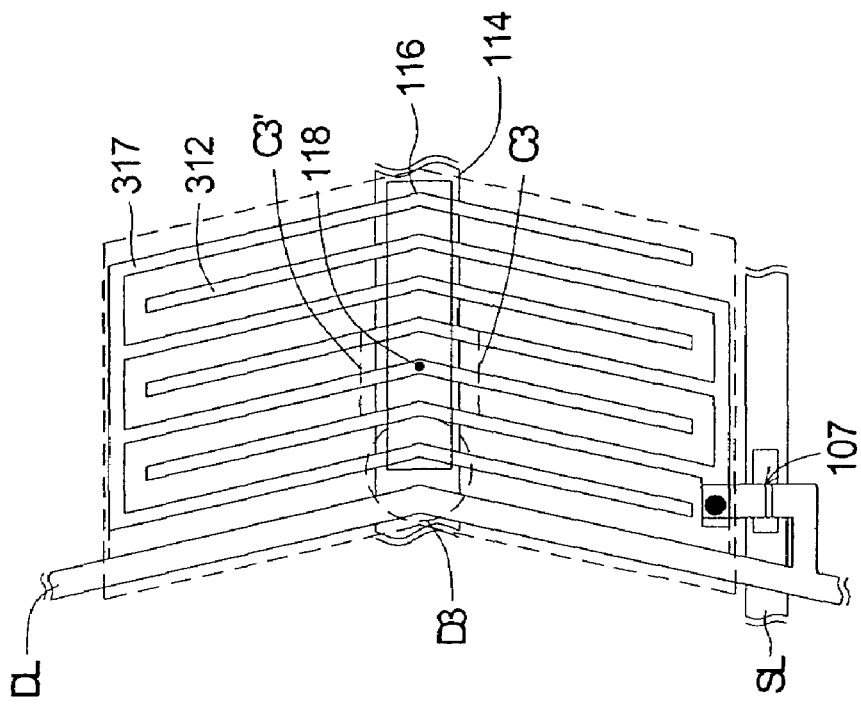
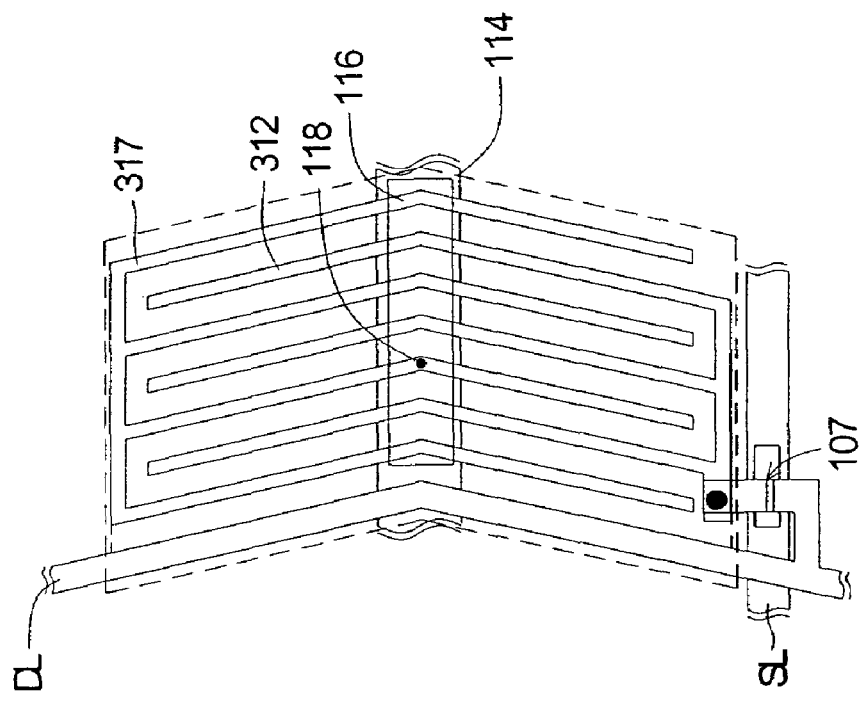

US 7,551,254 B2

DISPLAYING DEVICE WITH PREDETERMINED PATTERN FOR REPAIRING ELECTRICAL DEFECTS HAVING SLIT REGION IN TFT CONTROLLED ELECTRODE IN WHICH A FIRST SLIT THEREIN CORRESPONDS TO A SPACE SEPARATING FIRST AND SECOND CAPACITOR ELECTRODES

CROSS-REFERENCES TO RELATED APPLICATIONS

This application claims priority to Taiwan Application Ser. No. 093112096, filed Apr. 29, 2004, commonly assigned, and hereby incorporated by reference herein

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The invention relates in general to a displaying devices More particularly, the present invention provides a method and system capable of repairing the electrical defects in a displaying device using a predetermined pattern. Merely by way of example, the invention has been applied to liquid crystal displays, commonly called LCD, although there could be other applications.

With certain advantages of size, weight, low power consumption and no radiation contamination, liquid crystal displays ("LCD") have been widely used in recent years. The resolution of the LCD is determined according to the number of pixels. The LCD with a larger number of pixels presents a more delicate and detailed displayed image. Details of conventional LCDs are provided below.

A conventional tin film transistor liquid crystal display (TFT-LCD) has a first plate and a second plate. The first plate comprises a number of transparent pixel electrodes, color filters, and black matrices. The second plate comprises a number of scan lines, data lines, storage capacitors, switching elements (e.g., TFTs), and transparent pixel electrodes. In a TFT-LCD, the data lines perpendicularly intersect the scan lines to form a number of pixel regions. Thus, each pixel region is defined by a pair of scan lines and the corresponding data lines. Each pixel region includes a storage capacitor $C_{ST}$, a TFT, and a pixel electrode (e.g. a transparent ITO). The space between the first plate and the second plate is filled with numerous LC molecules. The polarizing films are generally disposed on the outer surfaces of the first plate and the second plate. A direct-view transmission type TFT-LCD further includes a backlight module for providing a light source of LCD.

FIG. 1A is a cross-sectional view taken along the line 1A-1A of FIG. 1C illustrating a conventional thin film transistor (TFT) of a second plate of LCD. A conventional method for manufacturing a TFT is described below. First, a substrate 102 is provided and a first metal layer is formed on the substrate 102. The first metal layer is then patterned to form a gate electrode 104. Next, a first insulating layer 106 is formed on the substrate 102 and covers the gate electrode 104. An amorphous-Si (a-Si) layer is formed on the first insulating layer 106 and then patterned to form a channel 105. After that, a second metal layer is formed on the insulating layer 106 and covers the channel 105. By performing a photolithography process, the second metal layer is patterned to form a drain D and a source S. Next, a passivation layer 108 is formed on the drain D and the source S and covers the first insulating layer 106. A via 110 is then formed within the passivation layer 108 to expose the partial surface of the source S. Finally, a pixel electrode (e.g. transparent indium tin oxide (ITO)) 112 is formed on the passivation layer 108 and fills the via hole 110 so that the pixel electrode 112 is electrically coupled to the source S.

The scan lines and data lines are respectively formed during the patterning step of forming the gate and the source/drain (S/D). Also, the scan lines and data lines are isolated by the first insulating layer 106.

FIG. 1B is a simplified cross-sectional view taken along the line 1B-1B of FIG. 1C illustrating a storage capacitor ($C_{ST}$) of a second plate of LCD. A conventional method for manufacturing a storage capacitor is described below. A storage capacitor ($C_{ST}$) is formed with a common electrode 114 and a capacitor electrode 116. As shown in FIG. 1B, the common electrode 114 and the capacitor electrode 116 are separated by the first insulating layer 106. The storage capacitor ($C_{ST}$) is formed together with the formation of the TFT. The common electrode 114 is formed after the formation and patterning of the first metal layer. Likewise, after the formation and patterning of the second metal layer, the capacitor electrode 116 is formed. The passivation layer 108 covers the capacitor electrode 116 and the first insulating layer 106. A via hole 118 is formed within the passivation layer 108. When the pixel electrode 112 is formed over the passivation layer 108, the pixel electrode 112 and the capacitor electrode 116 are electrically coupled through the via hole 118. In addition, storage capacitors of the pixels of the TFT-LCD have their common electrodes connected to a common voltage of the TFT-LCD. The storage capacitors of the pixels are used for controlling the voltage applied to the LC molecules. The common electrodes 114 of the storage capacitors can be connected to the adjacent scan lines. However, for reducing the drawback of gate delay during LCD driving, a "$C_{ST}$ on common" (i.e. storage capacitors on a common electrode) becomes the general trend in TFT-LCD design.

In addition, a transparent electrode is further formed on a glass substrate of the first plate of the conventional TFT-LCD. The first plate is assembled with the second plate, and the space therebetween is filled with numerous LC molecules. The polarization of the light passing through the liquid crystal layer is modulated by changing the alignment of the liquid crystal molecules that is varying with a voltage applied to the pixel electrode. According to the alignment of LC molecules and driving method, the TFT-LCD can be categorized into several modes, including vertical alignment mode (e.g. patterned vertical alignment (PVA) and multi-domain vertical alignment (MVA)), twisted nematic (TN) mode and in-plane switch mode. Many researches have reported that the visual effect of VA mode TFT-LCD can be improved by arranging the orientation of the LC molecules within a pixel into different groups. For example, a MVA mode TFT-LCD comprises a regional adjusting structure (e.g. a slit of a pixel electrode) for arranging the orientation of the LC molecules. When a voltage is applied, the LC molecules within a pixel are inclined to different directions so as to form the multi domains for improving the visual effect. In addition, after a voltage is applied, a capacitor of liquid crystal ($C_{LC}$) between the pixel electrode 112 of the second plate and the transparent electrode of the first plate is generated, and the value of $C_{LC}$ depends on the effective area of the pixel electrode 112.

FIG. 1C schematically illustrates a single pixel of a multi-domain vertical alignment (MVA) mode TFT-LCD. As shown in FIG. 1C, each pixel controlled by the data line (DL) and the scan line (SL) comprises a thin film transistor (TFT) 107, a pixel electrode (PE), and a common electrode ($V_{COM}$) of the storage capacitor. The common electrode ($V_{COM}$) of FIG. 1C is the patterned first metal layer (denoted as 114) of FIG. 1B. The capacitor electrode 116, the patterned second metal layer, is formed above the common electrode 114, and the pixel electrode 112 on the top is electrically connected to the capacitor electrode 116 through the via hole 118. Also, the slit 120 on the pixel electrode 112 is formed for the purpose of the effect of wide viewing angle. Furthermore, a protrusion formed on the first plate is used as the regional adjusting structure 111. In the PVA mode TFT-LCD, a slit of the transparent electrode of the first plate is used as the regional adjusting structure 111.

Over the years, LCD displays have proliferated from computer screens, mobile devices, and large flat panel displays used for television sets. Unfortunately, certain limitations still exist. As merely an example, certain pixels of the LCD could be electrically damaged due to manufacturing. Those damaged pixels, not being normally controlled by the electrical signals, degrade the displaying quality of the LCD. Such defects may occur during the manufacture of the second plate of TFT-LCD. For example, the incorrect pattern of electrodes formed by a bad photolithography process or the particle contamination occur on the second plate can cause the short circuit between the pixel and the data line. The pixel having the electrical defect (e.g. short-circuit) is a display flaw in the TFT-LCD.

FIG. 1D schematically illustrates a conventional method of repairing the defect on the pixel of FIG. 1C. As shown in FIG. 1D, a defect D1 occurs at the position which causes the electrical connection between one of the common electrode 114 and the data line (DL) and one of the capacitor electrode 116 and pixel electrode 112. The voltage applied to the common electrode or the signal originally transmitted through the DL into the pixel electrode is send into the pixel through the defect D1. Thus, the signal transmission to this pixel cannot be controlled by the TFT 107. FIG. 1E is a cross-sectional view taken along the line 1E-1E of FIG. 1C illustrating a defect occurring between the data line and the capacitor electrode. As shown in FIG. 1E, the data line and the second metal layer (i.e. capacitor electrode) 116 are at the same level, and it is easy to be short circuit if a defect such as a particle occurs on the position depicted in a dashed-circle. Since the defect is positioned above the common electrode 114, laser cutting for removing the defect will also damage or cut the common electrode 114 off so that the reference voltage won't be successfully transmitted to the pixels in the same rows through the common electrode. Accordingly, a conventional method for repairing the defect was developed by removing the pixel electrode at the periphery of the common electrode (e.g. laser cutting along the cutting lines C1, C1') for eliminating the interference (i.e. short circuit) caused by the defect D1.

The conventional method has a serious drawback of giving up the whole capacitor electrode 116 and over half a pixel electrode (i.e. the area above the cutting line C1 being unworkable). The overall capacity of each pixel, equal to the storage capacitor ($C_{ST}$) and the capacitor of liquid crystal ($C_{LC}$) before repairing (i.e. $C_{TOTAL}=C_{ST}+C_{LC}$), is decreased to less than half a capacitor of liquid crystal after repairing (i.e. $C_{TOTAL}<(\frac{1}{2})\times C_{LC}$). Accordingly, the workable pixel electrode area (less than half a pixel electrode) greatly decreases the effective displaying region of a pixel. Moreover, the voltage required for driving LC cannot be steadily maintained in a displaying period due to an absence of the storage capacitor of capacitor electrode, so as to decrease the displaying quality of the pixel.

In addition, if the defect (such as a particle) occurring at the position near the via hole 118 results in the short circuit between the pixel electrode 112 and the capacitor electrode 116, the voltage required for driving LC also cannot be steadily maintained in a displaying period so as to decrease the displaying quality of the pixel.

Similarly, the conventional repairing method applied to other conventional types of TFT-LCD has the issue of decrease of displaying quality.

FIG. 2A schematically illustrates a single pixel of a $C_{ST}$-On-Gate TFT-LCD. FIG. 2B schematically illustrates a conventional method of repairing the defect on the pixel of FIG. 2A. In a $C_{ST}$-On-Gate TFT-LCD, the capacitor electrode 116 is positioned on the gate line (GL), and the pixel electrode 112 is electrically connected to the capacitor electrode 116 through the via hole 118. When a defect D2 occurs to cause a short circuit between the DL2 and the capacitor electrode 116, a portion of the pixel electrode 112 corresponding to the capacitor electrode 116 is removed; for example, by laser cutting along the cutting line C2. However, the whole storage capacitor and part of the capacitor of liquid crystal have been given away.

FIG. 3A schematically illustrates a single pixel of an in-plane switch (IPS) mode TFT-LCD. FIG. 3B schematically illustrates a conventional method of repairing the defect on the pixel of FIG. 3A. The pixel electrode 312 and the field electrode 317 are oppositely arranged as two staggered forks. Also, the field electrode 317 is electrically connected to the capacitor electrode 116 through the via hole 118. The LC molecules of IPS mode TFT-LCD are driven by the electrical field between the pixel electrode 312 and the field electrode 317, and the displaying result depends on whether the backlight source penetrates the LC molecules or not. Since the capacitor electrode 116 and the data line DL are almost at the same plane, a defect D3 occurs at the dashed-circle position can easily cause a short circuit between the capacitor electrode 116 and the data line DL. The conventional repairing method is to remove parts of the field electrode 317 around the via hole 118, for example, by laser cutting along the cutting lines C3, C3'. The IPS mode TFT-LCD is normally black in an absent of electrical field. After applying the conventional method, this uncontrollable pixel is always presented as a dark point of TFT-LCD. Although no bright point of TFT-LCD is observed, the issue of electrical defect has not been solved at all.

According to the conventional repairing method described above, no matter what types of TFT-LCDs have to give up the whole storage capacitor. Even more than half a capacitor of liquid crystal has to be given up. The voltage required for driving LC cannot be steadily maintained in a displaying period (e.g. 16.67 ms at a display frequency of 60 Hz) by insufficient storage capacitor, so as to decrease the displaying quality. Also, cutting a large portion of pixel electrode greatly reduces the effective displaying region of a pixel. Therefore, how to decrease the effect of short circuit between electrodes, and effectively repair the electrical defect without degrading the display quality is an important goal to be achieved.

From the above, it is seen that improved techniques for manufacturing LCDs are highly desired.

BRIEF SUMMARY OF THE INVENTION

According to the present invention, techniques related to a displaying devices are provided More particularly, the present invention provides a method and system capable of repairing the electrical defects in a displaying device using a predetermined pattern. Merely by way of example, the invention has been applied to liquid crystal displays, commonly called LCD, although there could be other applications.

In a specific embodiment, the present invention provides a displaying device. The display device has at least a thin film transistor (TFT); a first electrode controlled by the TFT; a first capacitor electrode and a second capacitor electrode electrically connected to each other through the first electrode. The first electrode has a first slit. The first slit is positioned between a first zone and a second zone, wherein the first zone connects the first capacitor electrode and the first electrode, and the second zone connects the second capacitor electrode and the first electrode. The first electrode could be a pixel electrode and a field electrode.

In addition, the displaying device could further comprise a third capacitor electrode electrically connected to the first capacitor electrode and the second capacitor electrode through the first electrode. The second capacitor electrode could be positioned between the first capacitor electrode and the third capacitor electrode. Also, the first electrode further comprises a second slit positioned between a second zone and a third zone, wherein the second zone connects the second capacitor electrode and the first electrode, and the third zone connects the third capacitor electrode and the first electrode. Also, capacitor consisting in the second capacitor electrode could be different from capacitors consisting in the first capacitor electrode and in the third capacitor electrode. For example, capacitor of the second capacitor electrode can be larger than that of the first capacitor electrode and the third capacitor electrode.

In an alternative specific embodiment, the present invention provides a method for repairing electrical defect of displaying device. The method includes steps of providing a displaying device at least comprising a first capacitor electrode and a second capacitor electrode electrically connected to each other through a pixel electrode, and the pixel electrode having a first slit positioned between a first zone and a second zone, wherein the first zone connects the first capacitor electrode and the pixel electrode, and the second zone connects the second capacitor electrode and the pixel electrode. The method provides inspecting whether a short-circuited condition occurs on the displaying device, and determining a to-be-repaired position of the displaying device. The method also includes if the to-be-repaired position is corresponding to the first capacitor electrode, removing a portion of the pixel electrode corresponding to the first capacitor electrode for electrically isolating the first capacitor electrode from and the second capacitor electrode and other portions of the pixel electrode. If the to-be-repaired position is corresponding to the second capacitor electrode, the method removes a portion of the pixel electrode corresponding to the second capacitor electrode for electrically isolating the second capacitor electrode from and the first capacitor electrode and other portions of the pixel electrode.

Numerous benefits may be achieved using an embodiment of the present invention. As an example, the present invention can include methods and devices that provide a displaying device capable of repairing the electrical defects and a repairing method by using the same. In a specific embodiment, with a special pattern of the electrode layer and assisted with a suitable repairing method, the pixel after repaired still presents a good display quality so as to improve the yield of production of the displaying device. Depending upon the embodiment, one or more of these benefits may be achieved. These and other benefits may be found throughout the present specification and more particularly below.

In a specific embodiment, the term "special pattern" refers to a spatial arrangement that is different from the patterns in the prior art. Such term special pattern can be interpreted as a pattern, a plurality of features, or other elements, without departing from the scope of the claims herein. One of ordinary skill in the art would recognize many variations, modifications, and alternatives.

Other benefits, features, and advantages of the invention will become apparent from the following detailed description of the preferred but non-limiting embodiments. The following description is made with reference to the accompanying drawings.

BRIEF DESCRIPTION OF THE DRAWINGS

FIG. 3A (prior art) schematically illustrates a single pixel of an in-plane switch (IPS) mode TFT-LCD.

FIG. 3B (prior art) schematically illustrates a conventional method of repairing the defect on the pixel of FIG. 3A.

DETAILED DESCRIPTION OF THE INVENTION

According to the present invention, techniques related to a displaying devices are provided More particularly, the present invention provides a method and system capable of repairing the electrical defects in a displaying device using a predetermined pattern. Merely by way of example, the invention has been applied to liquid crystal displays, commonly called LCD, although there could be other applications.

The invention provides a displaying device having at least two capacitor electrodes electrically isolated in a single pixel, assisted with the special pattern of pixel electrode and the suitable repairing method, for repairing the electrical defects on the displaying device. The to-be-removed portion of pixel electrode is determined according to the position of defect. At least half a storage capacitor ($C_{ST}$) and most capacitor of liquid crystal are remained after repaired using the method of the invention. Four embodiments are taken for describing the different modes thin film transistor liquid crystal display (TFT-LCD) having special patterns of the invention and the repairing methods by using the same.

The embodiments disclosed herein are for illustrating the invention, but not for limiting the scope of the invention. Additionally, the drawings used for illustrating the embodiments of the invention only show the major characteristic parts in order to avoid obscuring the invention. Accordingly, the specification and the drawings are to be regard as an illustrative sense rather than a restrictive sense.

Figure 4:
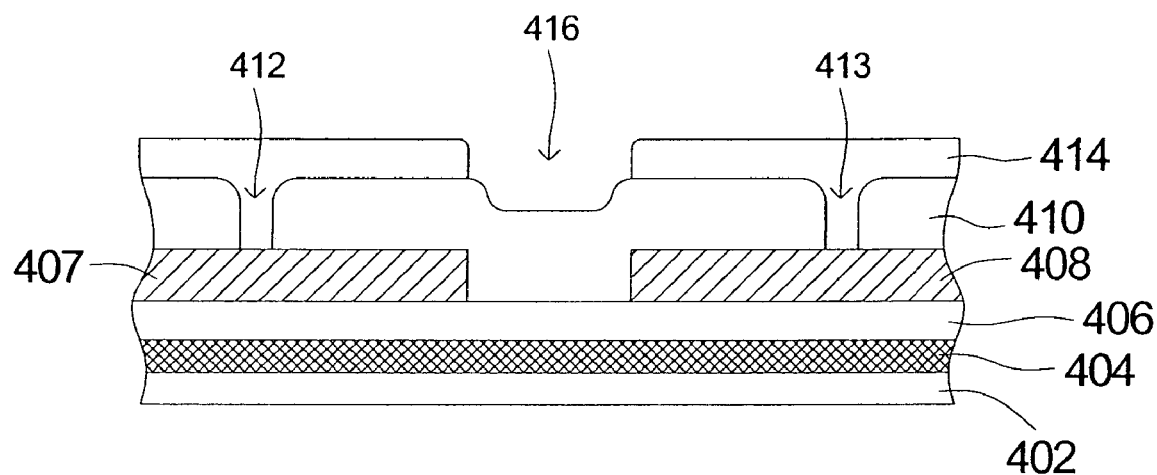
FIG. 4 is a cross-sectional view of a storage capacitor of a multi-domain vertical alignment (MVA) mode TFT-LCD according to the first embodiment of the invention.
Figure 5B:
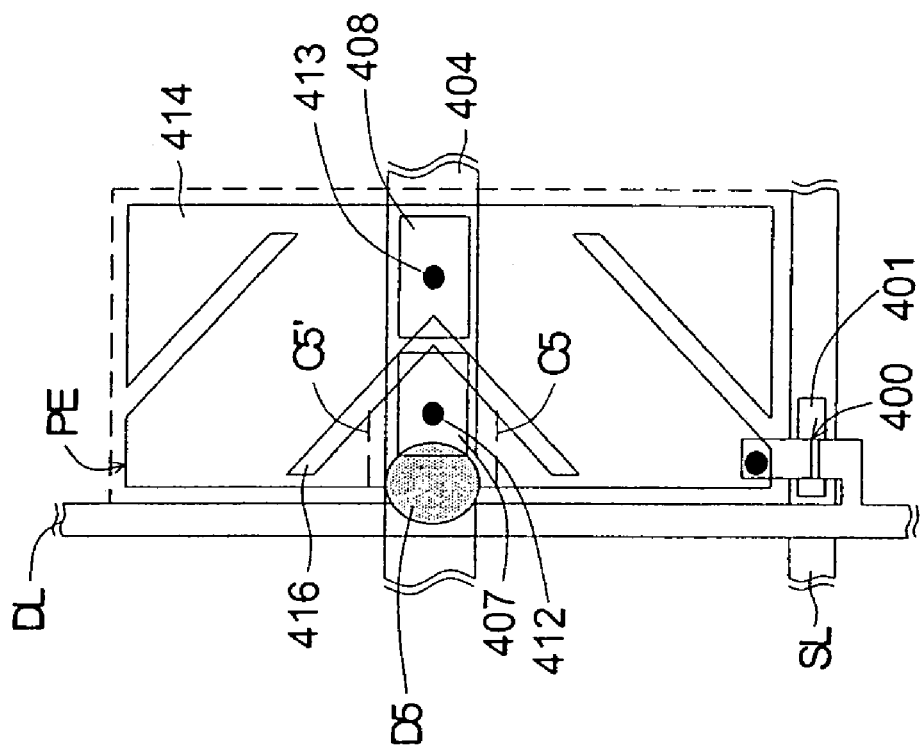
FIG. 5B schematically illustrates a method of repairing the defect on the pixel of FIG. 5A.
Figure 5A:
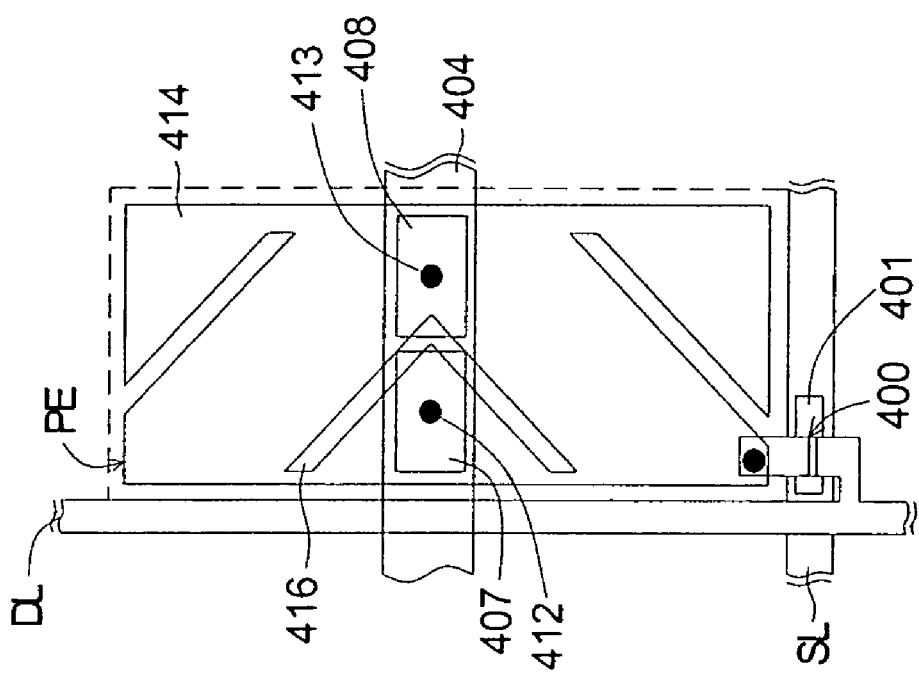
FIG. 5A schematically illustrates a single pixel of a MVA mode TFT-LCD according to the first embodiment of the invention.

FIG. 4 is a cross-sectional view of a storage capacitor of a multi-domain vertical alignment (MVA) mode TFT-LCD according to the first embodiment of the invention. FIG. 5A schematically illustrates a single pixel of a MVA mode TFT-LCD according to the first embodiment of the invention. FIG. 5B schematically illustrates a method of repairing the defect on the pixel of FIG. 5A. Without obscuring the drawings of the embodiment, it is noted that the regional adjusting structure of the first plate (e.g. slit on the transparent electrode of the first plate) is not shown in FIG. 5A and FIG. 5B.

The method of fabricating the storage capacitor of the first embodiment is described as follows. First, a first metal layer is formed on a substrate 402 and patterned to form a common electrode 404. The first metal layer, for example, comprises a main portion made of molybdenum (Mo), chromium (Cr), aluminum (Al) or alloy of aluminum and neodymium (Al—Nd), and a sub-portion made of Mo, molybdenum nitride (MoN), titanium (Ti) or alloy thereof laminated on the main portion. Then, a first insulating layer 406, such as silicon nitride (SiNx) or silicon oxide (SiOx), is formed on the substrate 402 and covers the common electrode 404. Next, a second metal layer is formed on the first insulating layer 406, and then patterned to form a first capacitor electrode 407 and a second capacitor electrode 408 by photolithography process. The second metal layer, for example, is a laminated structure including Mo, Al and Mo layers (Mo/Al/Mo), or MoN, Al and MoN layers (MoN/Al/MoN). Next, a second insulating layer, also known as passivation layer 410, is formed to cover the first capacitor electrode 407, the second capacitor electrode 408 and the first insulating layer 406. Then, a first via hole 412 and a second via hole 413 are formed in the passivation layer 410 to expose the surfaces of the first capacitor electrode 407 and the second capacitor electrode 408, respectively. Next, the pixel electrode (made of material such as indium tin oxide (ITO)) is formed and patterned on the passivation layer. Also, several slits are formed on the pixel electrode for the purpose of wide viewing angle of TFT-LCD.

In FIG. 5A, the scan line (SL) and the data line (DL) are formed together with the patterning process of the gate electrode and the source/drain (S/D), wherein the SL and DL are separated by the first insulating layer 406, and the displaying condition of the pixel is controlled by a switch device (such as the TFT 400). In addition, storage capacitors of all the pixels of the TFT-LCD have their common electrodes connected to a common voltage of the TFT-LCD.

As shown in FIG. 4 and FIG. 5A, the pixel electrode 414 is coupled to the first capacitor electrode 407 and the second capacitor electrode 408 through the first via hole 412 and the second via hole 413, respectively. It is particularly noted that at least one slit 416 is positioned between the zone for electrical connecting the first capacitor electrode 407 and pixel electrode 414 (i.e. the first via hole 412 in the first embodiment) and the zone for electrical connecting the second capacitor electrode 408 and pixel electrode 414 (i.e. the second via hole 413 in the first embodiment). According to the first embodiment, the slit 406 is configured correspondingly to the position separated the first capacitor electrode 407 and the second capacitor electrode 408.

When a defect D5 occurs to cause a short circuit between one of the common electrode 404 and the DL, and one of the first capacitor electrode 407, the second capacitor electrode 408 and the pixel electrode 414, the signal can not be successfully transmitted to the pixel. The pixel having defect D5 needs to be repaired.

In the first embodiment, it is assumed that the possibilities of defect D5 occurs at the right and left sides of pixel electrode 414 are equal. Thus, the area of the first capacitor electrode is substantially equal to the area of the second capacitor electrode (i.e. the capacitor values of the first and second capacitor electrodes almost the same).

When the defect D5 occurs to connect the first capacitor 407 and the DL as shown in FIG. 5B, a portion of pixel electrode 414 needs to be removed, for example by laser cutting along the cutting lines C5, C5', for electrically isolating the first capacitor electrode 407 and the second capacitor electrode 408. The cutting lines C5, C5' on the pixel electrode 414 are formed at the positions corresponding to the outer periphery of the common electrode 404, and preferably are parallel to the extending direction of the common electrode 404. Since the slit 416 spans the common electrode 404, a small, isolated region containing the first capacitor 407 is formed after the pixel is repaired by cutting along the cutting lines C5, C5'. Only a small portion of pixel electrode is cut away (i.e. the area between the cutting lines C5, C5'). Therefore, the overall capacity of this pixel, equal to a storage capacitor ($C_{ST}$) and a capacitor of liquid crystal ($C_{LC}$) before repaired (i.e. $C_{TOTAL} = C_{ST} + C_{LC}$), is changed almost to half a storage capacitor ($C_{ST}$) and a capacitor of liquid crystal ($C_{LC}$) (i.e. $C_{TOTAL} \ 0.5 C_{ST} + C_{LC}$) after repaired. Compared to conventional repairing method (which the overall capacity of the pixel being repaired has decreased to less than ($\frac{1}{2}$)×$C_{LC}$), the displaying device with a special pattern and the corresponding repairing method of the invention is able to save almost the whole pixel electrode and able to lose less capacitor. Thus, TFT-LCD having the special pixel pattern and applied with the corresponding repairing method certainly presents a better display quality.

According to the illustration above, the slit 416 preferably spans the common electrode 404, which means the distance between two ends of the slit 416 is larger than the wideness of the common electrode 404. If the slit 416 doesn't spans the common electrode 404, the welding between the pixel electrode 414 and part of the common electrode 404 may occur during the laser removing step for electrically isolating the first capacitor electrode 407 and the second capacitor electrode 408.

In the MVA or patterned vertical alignment (PVA) mode TFT-LCD, the slits on the pixel electrode 414, formed for the purpose of electrical isolation between the first capacitor electrode 407 and the second capacitor electrode 408, could be also used for adjusting the inclining directions of LC molecules. When a voltage is applied to the pixel, inclining directions of the LC molecules depends on the direction of the regional adjusting structure (i.e. the slits of the pixel electrode).

Figure 7:
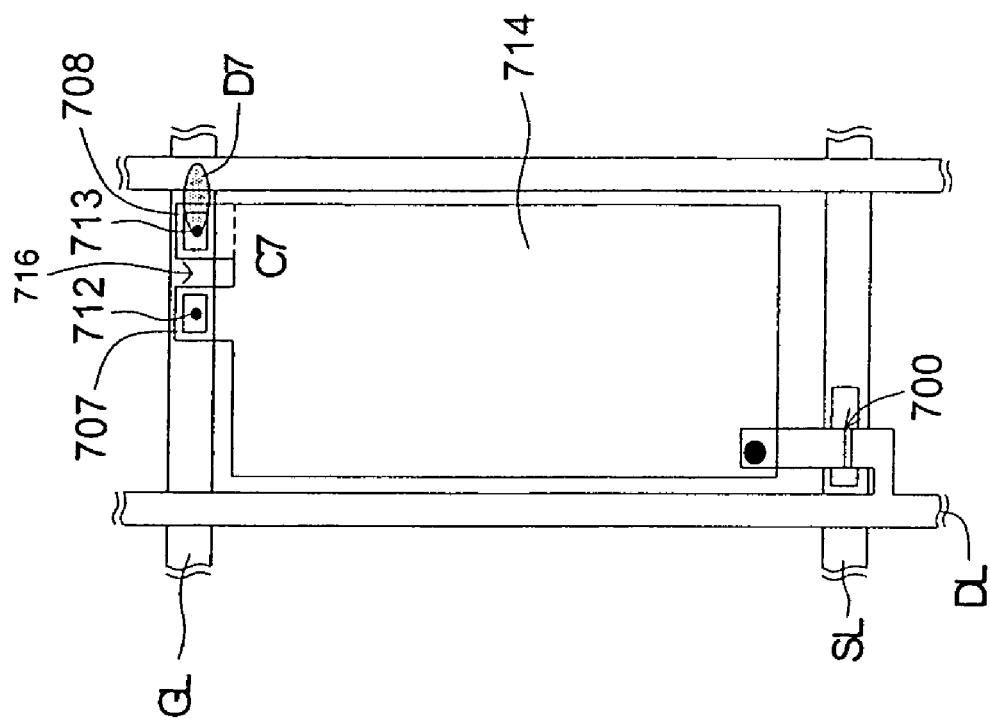
FIG. 7 schematically illustrates a single pixel of another TFT-LCD and the method of repairing the defect according to the second embodiment of the invention, wherein the storage capacitor consists in the capacitor electrode and the gate electrode (known as "$C_{ST}$ on Gate").
Figure 6:
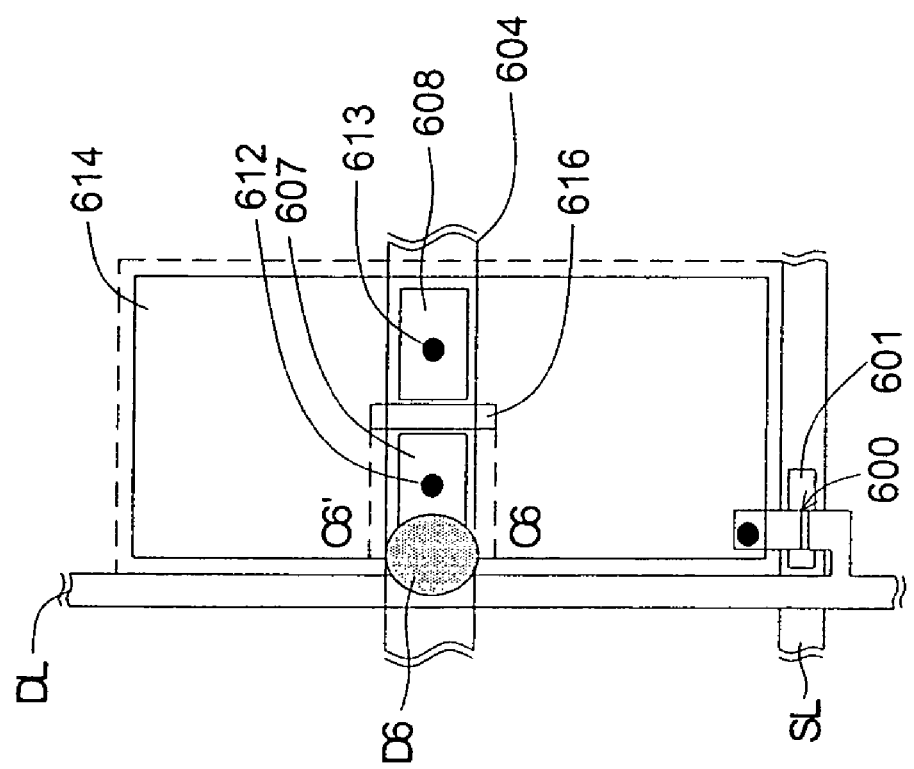
FIG. 6 schematically illustrates a single pixel of a TFT-LCD (e.g. a twisted nematic (TN) mode) and the method of repairing the defect according to the second embodiment of the invention, wherein the storage capacitor consists in the capacitor electrode and the common electrode (known as "$C_{ST}$ on Com").

FIG. 6 schematically illustrates a single pixel of a TFT-LCD (e.g. a twisted nematic (TN) mode) and the method of repairing the defect according to the second embodiment of the invention, wherein the storage capacitor consists in the capacitor electrode and the common electrode (known as "$C_{ST}$ on Com"). FIG. 7 schematically illustrates a single pixel of another TFT-LCD and the method of repairing the defect according to the second embodiment of the invention, wherein the storage capacitor consists in the capacitor electrode and the gate electrode (known as "$C_{ST}$ on Gate").

In addition, the cross-sectional view of the storage capacitor of the TFT-LCD of the second embodiment can be referred to FIG. 4.

In FIG. 6, the pixel at least comprises a common electrode 604, a first capacitor electrode 607, a second capacitor electrode 608, a pixel electrode 614 and a TFT 600. The pixel electrode 614 is controlled by the TFT 600. The first capacitor electrode 607 and the second capacitor electrode 608 are connected to the pixel electrode 614 through the first via hole 612 and the second via hole 613, respectively.

It is particularly noted that at least one slit 616 formed on the pixel electrode 614 is positioned between the zone for electrical connecting the first capacitor electrode 607 and pixel electrode 614 (i.e. the first via hole 612 in the second embodiment) and the zone for electrical connecting the second capacitor electrode 608 and pixel electrode 614 (i.e. the second via hole 613 in the second embodiment). When a defect D6 occurs, a portion of pixel electrode 414 corresponding to the position of defect D6 needs to be removed, for example by laser cutting along the cutting lines C6, C6', for electrically isolating the first capacitor electrode 607 and the second capacitor electrode 608. The slit 616 spans the capacitor electrode 608 (i.e. the second metal layer), and preferably spans the common electrode 604 (i.e. the first metal layer). Therefore, no damage is caused on the structure beneath the pixel electrode after the reparation is performed by laser cutting along the cutting lines C6, C6'. After repaired, the overall capacity of this pixel is almost equal to half a storage capacitor ($C_{ST}$) and a capacitor of liquid crystal ($C_{LC}$) (i.e. $C_{TOTAL}=0.5C_{ST}+C_{LC}$). Accordingly, the displaying device with a special pattern and the corresponding repairing method of the invention is able to save almost the whole pixel electrode and able to lose less capacitor. Thus, TFT-LCD having the special pixel pattern and applied with the corresponding repairing method certainly presents a better display quality.

In FIG. 7, the pixel electrode 714 is controlled by the TFT 700. The first capacitor electrode 707 and the second capacitor electrode 708 are formed above the GL, and connected to the pixel electrode 714 through the first via hole 712 and the second via hole 713, respectively. The slit 716 of the pixel electrode 714 is positioned between the zone for electrical connecting the first capacitor electrode 707 and pixel electrode 714 (i.e. the first via hole 712 in the second embodiment) and the zone for electrical connecting the second capacitor electrode 708 and pixel electrode 714 (i.e. the second via hole 713 in the second embodiment). When a defect D7 occurs, a portion of pixel electrode 714 corresponding to the position of defect D7 needs to be removed. Due to the special pattern of FIG. 7, it is easy to electrically isolate the first capacitor electrode 707 and the second capacitor electrode 708 by laser cutting along the cutting line C7. After repaired, the overall capacity of this pixel is almost equal to half a storage capacitor ($C_{ST}$) and a capacitor of liquid crystal ($C_{LC}$) (i.e. $C_{TOTAL}=0.5C_{ST}+C_{LC}$). Accordingly, the reparation almost has no effect on the effective area of the pixel electrode and saves at least half a storage capacitor ($0.5C_{ST}$). Thus, TFT-LCD having the special pixel pattern and applied with the corresponding repairing method certainly presents a better display quality.

Figure 8B:
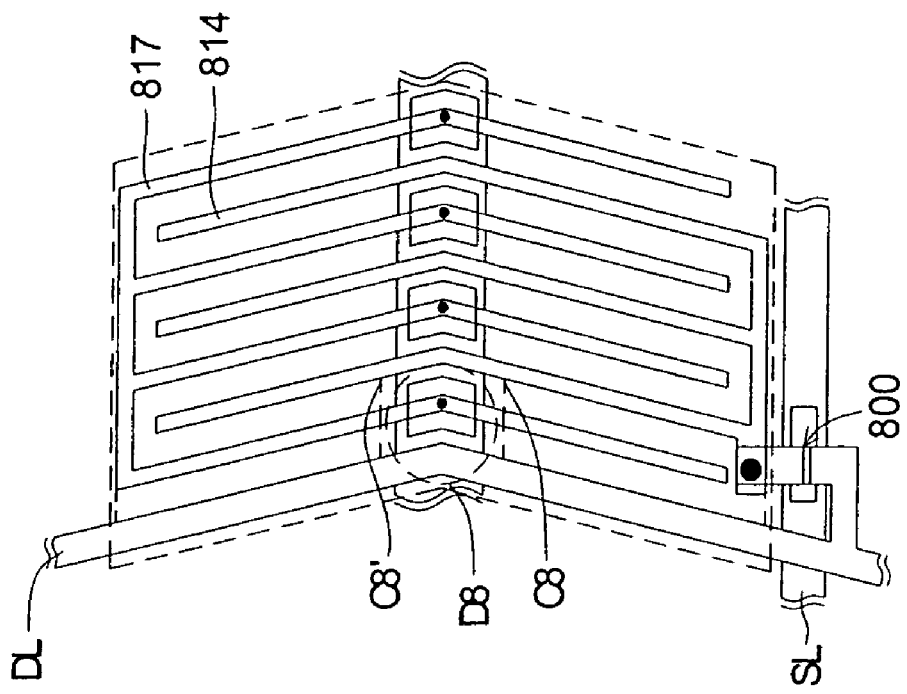
FIG. 8B schematically illustrates a method of repairing the defect on the pixel of FIG. 8A.
Figure 8A:
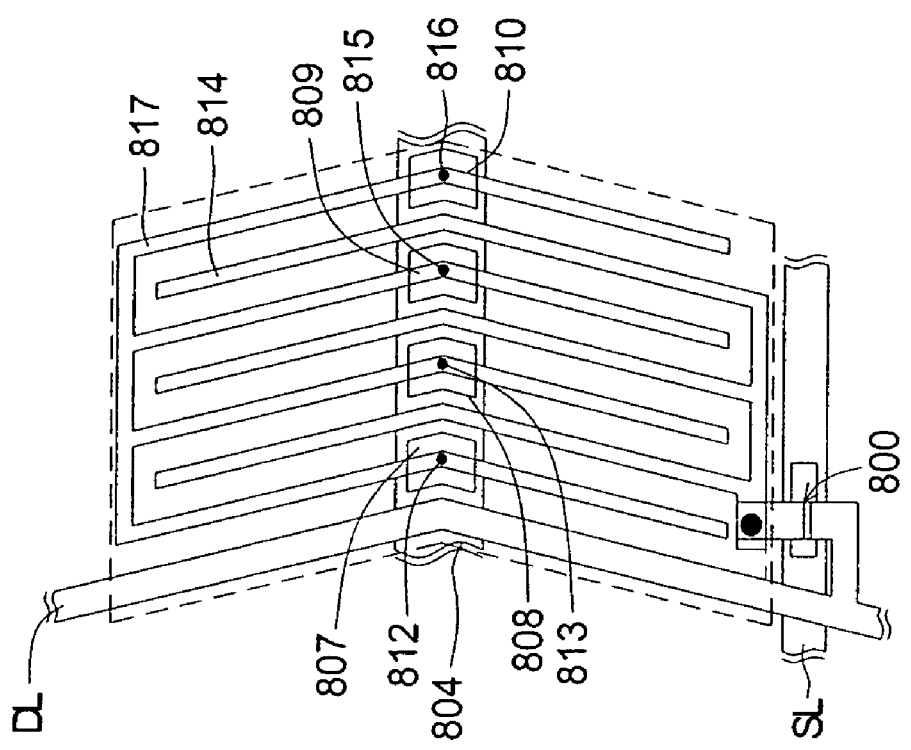
FIG. 8A schematically illustrates a single pixel of a TFT-LCD (e.g. a in-plane switch (IPS) mode) according to the third embodiment of the invention.

FIG. 8A schematically illustrates a single pixel of a TFT-LCD (e.g. a in-plane switch (IPS) mode) according to the third embodiment of the invention. FIG. 8B schematically illustrates a method of repairing the defect on the pixel of FIG. 8A. The pixel at least comprises a common electrode 804, a first capacitor electrode 807, a second capacitor electrode 808, a third capacitor electrode 809, a fourth capacitor electrode 810, a pixel electrode 814 and a TFT 800. The pixel electrode 814 is controlled by the TFT 800. The pixel electrode 814 and the field electrode 817 are oppositely arranged as two staggered forks. Also, there is a slit between the adjacent pixel electrodes 814. The first capacitor electrode 807, the second capacitor electrode 808, the third capacitor electrode 809 and the fourth capacitor electrode 810 are electrically connected to the field electrode 817 through the first via hole 812, the second via hole 813, the third via hole 814 and the fourth via hole 815, respectively.

When a defect D8 occurs, a portion of field electrode 817 corresponding to the position of defect D8 needs to be removed, by laser cutting along the cutting lines C8, C8' as shown in FIG. 8B, for electrically isolating the first electrode 807 from the other capacitor electrodes. After repaired, only one-fourth of the storage capacitor ($0.25 C_{ST}$) is lost, and very small area of the pixel electrode 814 is cut off. Thus, TFT-LCD having the special pixel pattern and applied with the corresponding repairing method still presents a good display quality.

In the aforementioned embodiments, two capacitor electrodes in a pixel (presented in the first and second embodiments) and four capacitor electrodes in a pixel (presented in the third embodiment) are taken for illustration, but the invention is not limited herein. The number of the capacitor electrode is optionally determined in accordance with the practical application. Also, the electrical-isolation portion and the to-be-removed portion of pixel electrode depend on the position of defect. Also, the pattern of the pixel electrode and the slit(s), not limited in those embodiments, is optionally determined in accordance with the practical application. In addition, the area ratio of the first capacitor electrode to the second capacitor electrode is adjustable, depending on the usual positions of the defect.

Figure 9B:
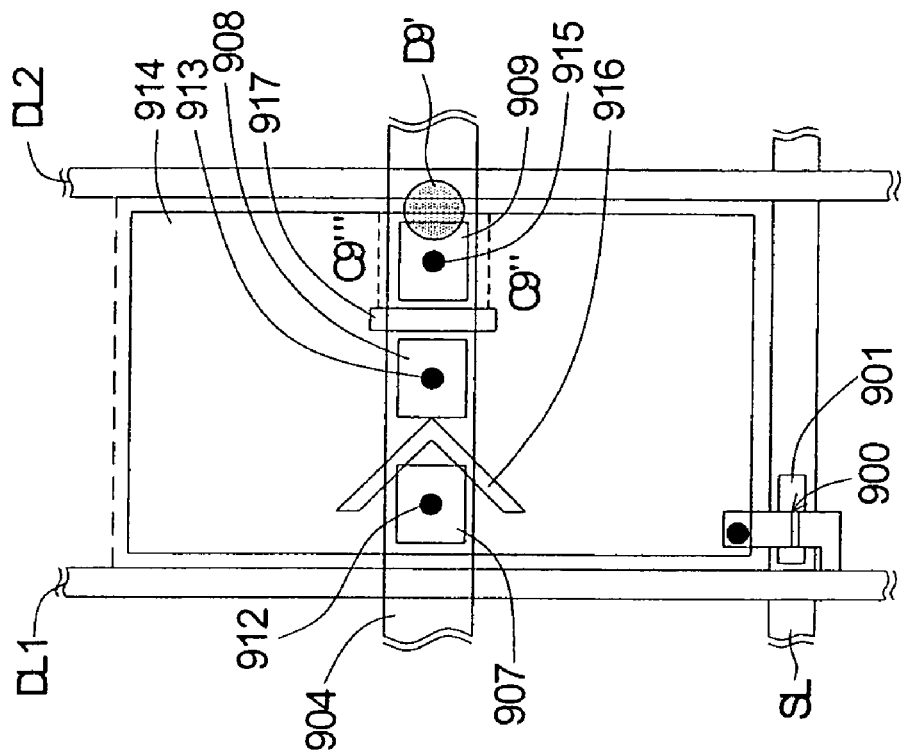
FIG. 9A and FIG. 9B schematically illustrate the single pixel of a TFT-LCD and the method of repairing the defect on the pixel according to the fourth embodiment of the invention.
Figure 9A:
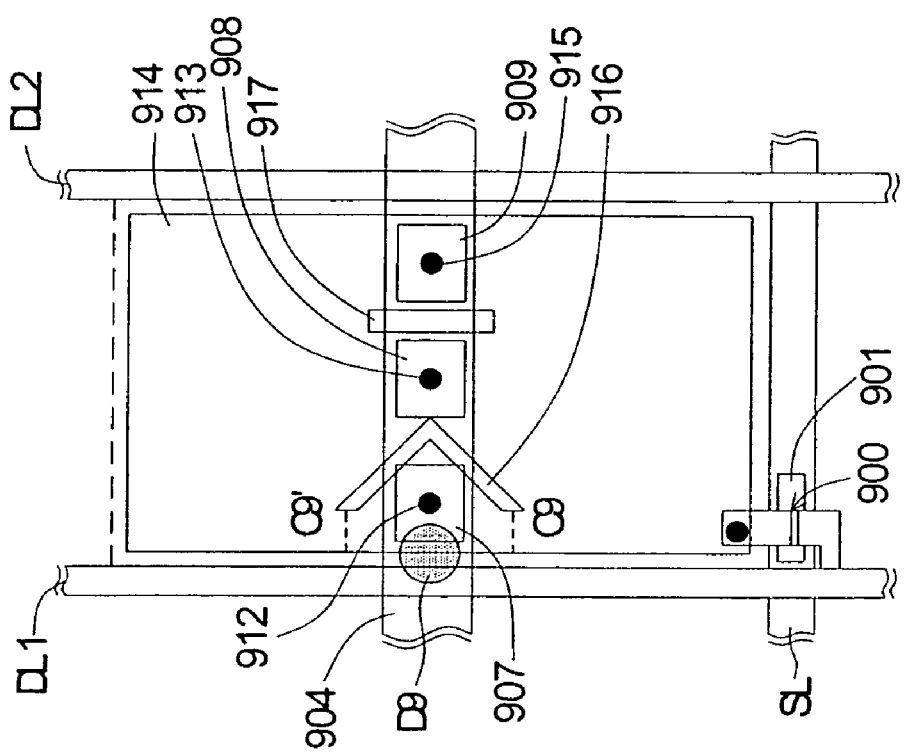

FIG. 9A and FIG. 9B schematically illustrate the single pixel of a TFT-LCD and the method of repairing the defect on the pixel according to the fourth embodiment of the invention. The difference between FIG. 9A and FIG. 9B is the positions of defects, and the repairing methods slight varied with the positions of defects. The pixel at least comprises a common electrode 904, a first capacitor electrode 907, a second capacitor electrode 908, a third capacitor electrode 909, a pixel electrode 914 and a TFT 900. The first capacitor electrode 907, the second capacitor electrode 908 and the third capacitor electrode 909 are electrically connected to the pixel electrode 914 through the first via hole 912, the second via hole 913 and the third via hole 915, respectively.

In addition, there are a first slit 916 and a second slit 917 configured as different shapes on the pixel electrode 914. The first via hole 912 and the second via hole 913 are positioned between two sides of the first slit 916. The second via hole 913 and the third via hole 915 are positioned between two sides of the second slit 917.

If the defect D9 occurs to cause a short circuit between the first capacitor electrode 907 and a first data line DL1, as shown in FIG. 9A, a portion of pixel electrode 914 corresponding to the position of defect D9 needs to be removed, by laser cutting along the cutting lines C9, C9', for electrically isolating the first capacitor electrode 907 from the second capacitor electrode 908 and the third capacitor electrode 909. After repaired, two-third of the storage capacitor (($2/3$) $C_{ST}$) is saved.

Similarly, if the defect D9' occurs to cause a short circuit between the third capacitor electrode 909 and a second data line DL2, as shown in FIG. 9B, a portion of pixel electrode 914 corresponding to the position of defect D9' needs to be removed, by laser cutting along the cutting lines C9'', C9''', for electrically isolating the third capacitor electrode 909 from the second capacitor electrode 908 and the first capacitor electrode 907.

Therefore, N (N>2, N is integer) capacitor electrodes having the same effective areas could be formed in a single pixel. If a defect is observed, the position of the defect is determined, and then a portion of pixel electrode corresponding to the position of defect is removed for isolating the associated capacitor electrode from the other capacitor electrodes. After repaired, the overall capacity of this pixel is almost equal to $[(N-1)/N]$ of a storage capacitor ($C_{ST}$) and a capacitor of liquid crystal ($C_{LC}$) (i.e. $C_{TOTAL}=[(N-1)/N] C_{ST}+C_{LC}$). The larger the value of N, the better the display quality of the pixel (i.e. the display quality of the repaired pixel closer to that of the flawless pixel).

Moreover, the defect usually occurs at the second metal layer during the fabrication, wherein the second metal layer is patterned to form the data line and the capacitor electrode. Thus, the effective areas of the first capacitor electrode 907 and the third capacitor electrode 909 can be smaller than the effective area of the second capacitor electrode 908. Whether one or both of the first capacitor electrode 907 and the third capacitor electrode 909 are isolated, larger value of capacitor can be saved after repaired. For example, the capacitors consisting in the first capacitor electrode 907, the second capacitor electrode 908 and the third capacitor electrode 909 are $0.2C_{ST}$, $0.65C_{ST}$ and $0.15C_{ST}$, respectively. If the first capacitor electrode 907 is isolated, the overall capacitor of the pixel is $0.8C_{ST}$. Similarly, if the third capacitor electrode 909 is isolated, the overall capacitor of the pixel is $0.85C_{ST}$. If the first capacitor electrode 907 and the third capacitor electrode 909 are isolated from the second capacitor electrode 908, the overall capacitor of the pixel is $0.65C_{ST}$.

Figure 1A:
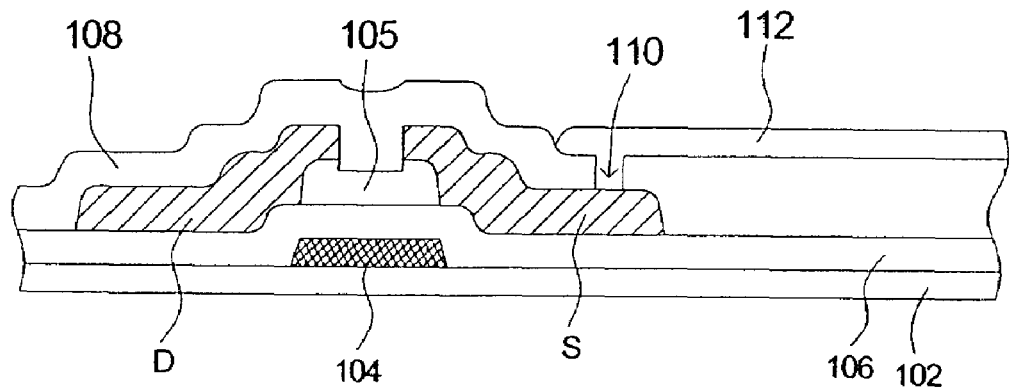
FIG. 1A (prior art) is a cross-sectional view taken along the line 1A-1A of FIG. 1C illustrating a thin film transistor (TFT) of a second plate of LCD.
Figure 1B:
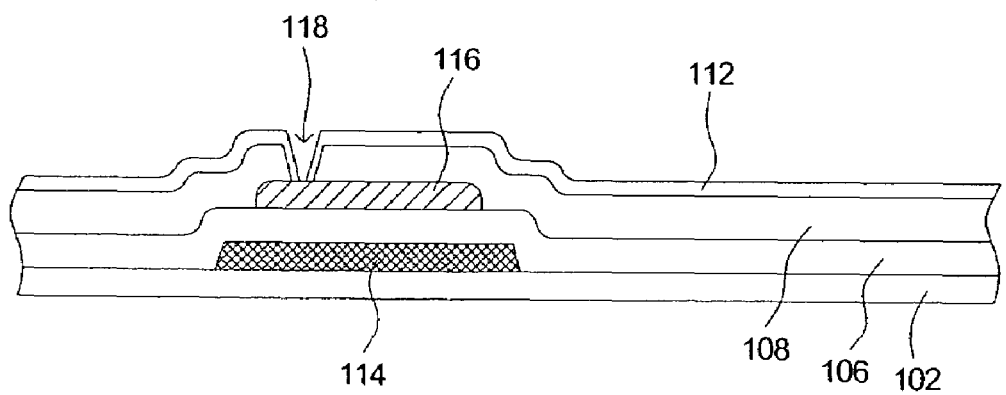
FIG. 1B (prior art) is a cross-sectional view taken along the line lB-lB of FIG. 1C illustrating a storage capacitor ($C_{ST}$) of a second plate of LCD.
Figure 1D:
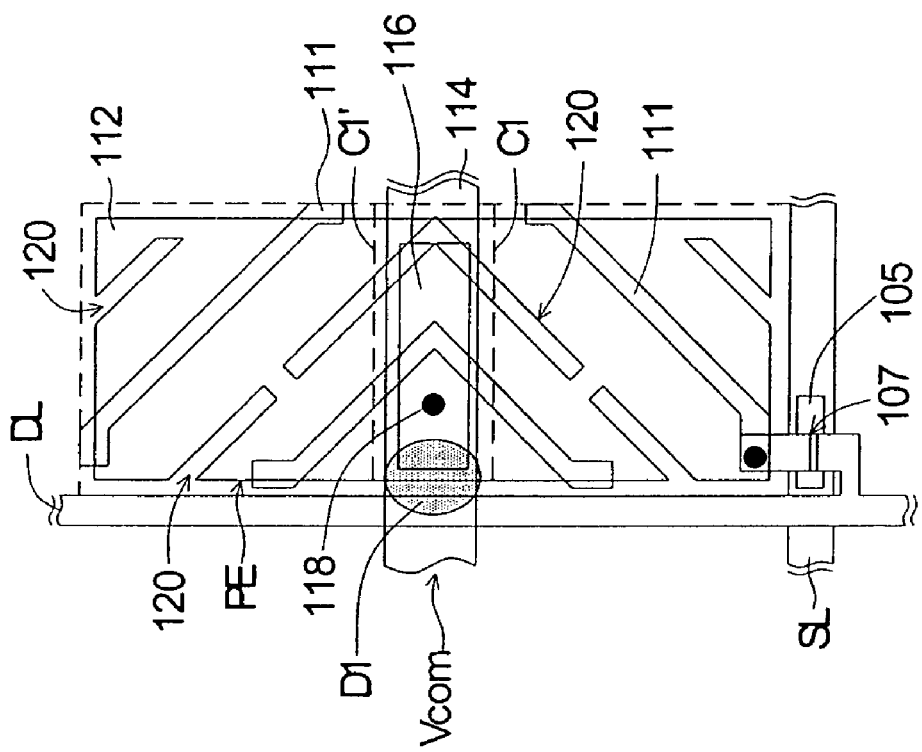
FIG. 1D (prior art) schematically illustrates a conventional method of repairing the defect on the pixel of FIG. 1C.
Figure 1C:
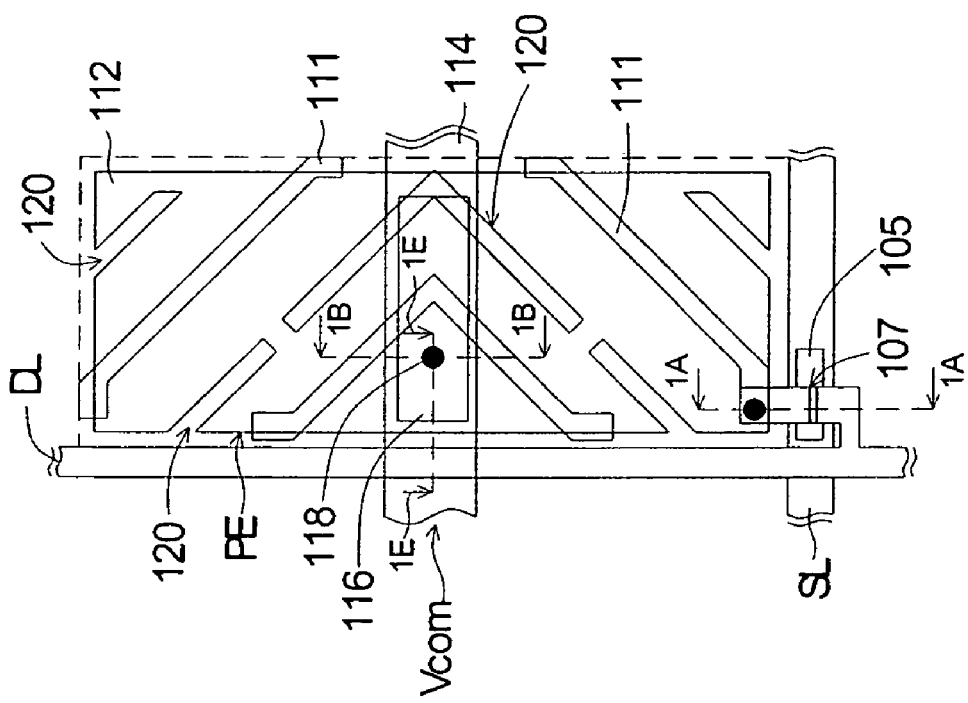
FIG. 1C (prior art) schematically illustrates a single pixel of a multi-domain vertical alignment (MVA) mode TFT-LCD.
Figure 1E:
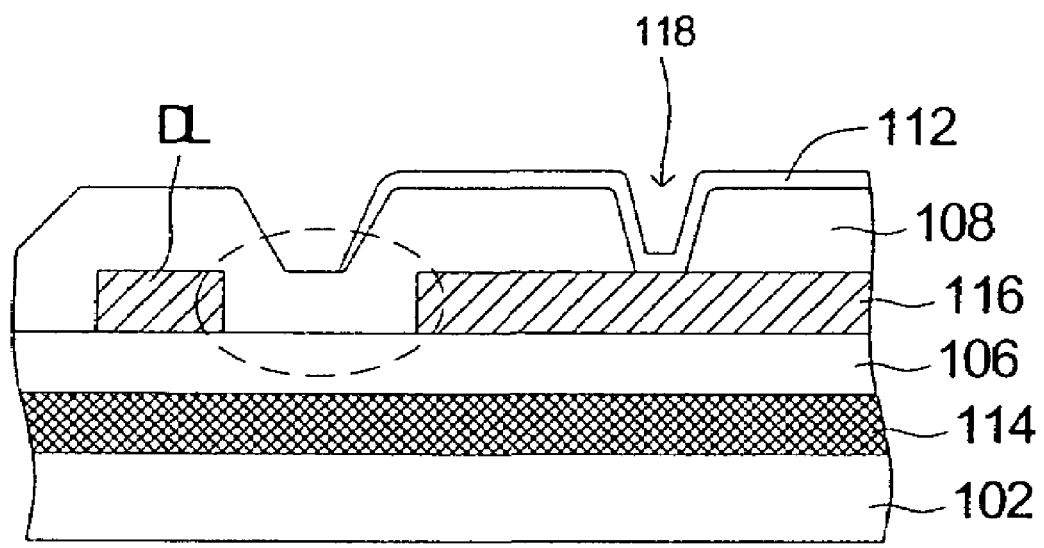
FIG. 1E (prior art) is a cross-sectional view taken along the line lE-lE of FIG. 1C illustrating a defect occurring between the data line and the capacitor electrode.
Figure 2B:
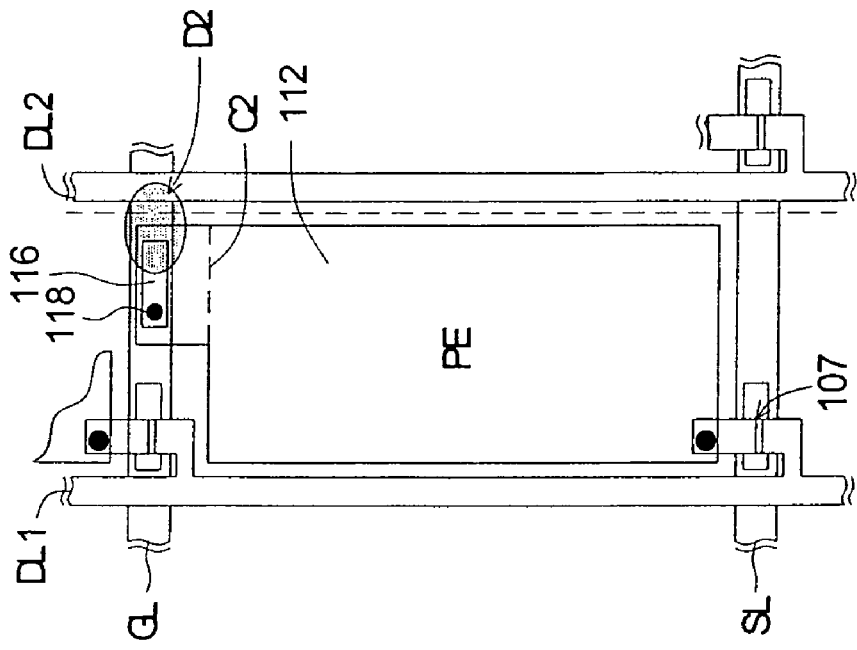
FIG. 2B (prior art) schematically illustrates a conventional method of repairing the defect on the pixel of FIG. 2A.
Figure 2A:
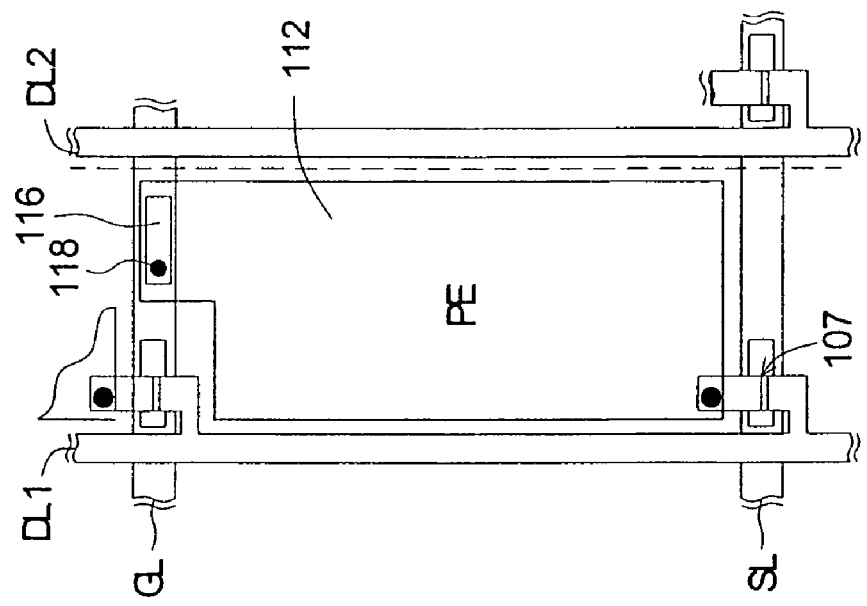
FIG. 2A (prior art) schematically illustrates a single pixel of a $C_{ST}$-On-Gate TFT-LCD.

Although the four embodiments are illustrated above, the invention is not limited herein. It is, of course, understood by people skilled in the related art that the slight modification under the feature of the invention is acceptable. For example, the TFT configuration is not limited in the illustration of FIG. 1A. The top-gate structure of the LCD (i.e. the gate electrode formed above the semiconductor layer) can be used in the invention. Also, an etching stop layer could be further formed on the semiconductor layer for protecting the TFT structure, and the channel region could be formed using a poly-silicon structure. Moreover, the color filter (usually formed at the first plate), the TFT and the capacitor electrode could be disposed at the second plate. For example, disposed between the pixel electrode and the capacitor electrode.

According to the aforementioned embodiments of the invention, the first capacitor electrode and the second capacitor electrode are independently connected to the pixel electrode. At least a slit is formed on the pixel electrode. At least two electrical-connecting zones are formed in a pixel (i.e. one zone connecting the first capacitor electrode and the pixel electrode, the other zone connecting the second capacitor electrode and the pixel electrode). With the slit, the short-circuited area can be easily isolated by removing a portion of pixel electrode. For maintaining the sufficient capacitor of the pixel, the area ratio of the first capacitor electrode to the second capacitor electrode is adjustable, and the shapes of the first and second capacitor electrodes are variable.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal displaying device, at least comprising:
a thin film transistor (TFT);
a first electrode, coupled to and controlled by the TFT, and the first electrode having a first slit region coupled to the first electrode, wherein the first electrode is a pixel electrode;
a first capacitor electrode and a second capacitor electrode, electrically connected to each other through the first electrode, wherein the liquid crystal displaying device comprises a vertical-alignment liquid crystal layer, and the first slit region is also used for adjusting orientation of the liquid crystal layer so that a plurality of liquid crystal molecules of the liquid crystal layer are inclined into a plurality of directions while a voltage is applied; and
a third capacitor electrode electrically connected to the first capacitor electrode and the second capacitor electrode through the pixel electrode, and the pixel electrode having a second slit positioned between a second zone for connecting the second capacitor electrode and the pixel electrode and a third zone for connecting the third capacitor electrode and the pixel electrode.

2. The liquid crystal displaying device according to claim 1, wherein the second capacitor electrode is formed between the first capacitor electrode and the third capacitor electrode, and capacitor consisting in the second capacitor electrode is different from capacitors consisting in the first capacitor electrode and the third capacitor electrode.

3. The liquid crystal displaying device according to claim 1, wherein capacitor consisting in the second capacitor electrode is larger than capacitors consisting in the first capacitor electrode and the third capacitor electrode.

4. A liquid crystal displaying device, at least comprising:
a thin film transistor (TFT);
a first electrode, coupled to and controlled by the TFT, and the first electrode having a first slit region coupled to the first electrode;
a first capacitor electrode and a second capacitor electrode, electrically connected to each other through the first electrode, wherein the liquid crystal displaying device comprises a vertical-alignment liquid crystal layer, and the first slit region is also used for adjusting orientation of the liquid crystal layer so that a plurality of liquid crystal molecules of the liquid crystal layer are inclined into a plurality of directions while a voltage is applied;

a first metal layer formed on a substrate;

a first insulating layer covering the first metal layer;

a second metal layer having a first part and a second part isolated from each other, and the first part and the first metal layer forming the first capacitor electrode, and the second part and the first metal layer forming the second capacitor electrode; and wherein the first slit region includes a first slit positioned corresponding to a space for separating the first part and the second part of the second metal layer.

5. The liquid crystal displaying device according to claim 4 further comprising a passivation layer for covering the second metal layer, and the first electrode formed on the passivation layer.

6. The liquid crystal displaying device according to claim 5, wherein the passivation layer comprises a first via hole and a second via hole, and the first capacitor electrode and the second capacitor electrode respectively connected to the first electrode through the first via hole and the second via hole.

7. The liquid crystal displaying device according to claim 6, wherein the first via hole and the second via hole are positioned at different sides of the first slit region fist slit.

8. The liquid crystal displaying device according to claim 4, wherein the first slit region fist slit spans the second metal layer, and a length of the first slit region is larger than a wideness of the second metal layer.

9. The liquid crystal displaying device according to claim 4, wherein the first slit region fist slit spans the first metal layer, and a length of the first slit region is larger than a wideness of the first metal layer.

* * * * *